(12) United States Patent
Jauernig et al.

(10) Patent No.: US 7,833,104 B2
(45) Date of Patent: Nov. 16, 2010

(54) SEALING RING FOR A UNIVERSAL JOINT BUSH

(75) Inventors: Frank Jauernig, Aurachtal (DE);
Manfred Lehmeier, Nuremberg (DE);
Dieter Jauernig, Herzogenaurach (DE);
Martin Kruppa, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 294 days.

(21) Appl. No.: 11/814,697

(22) PCT Filed: Nov. 23, 2005

(86) PCT No.: PCT/EP2005/012514

§ 371 (c)(1),
(2), (4) Date: Aug. 15, 2007

(87) PCT Pub. No.: WO2006/079381

PCT Pub. Date: Aug. 3, 2006

(65) Prior Publication Data

US 2008/0207339 A1    Aug. 28, 2008

(30) Foreign Application Priority Data

Jan. 26, 2005    (DE) .................. 10 2005 003 609

(51) Int. Cl.
*F16D 3/40*    (2006.01)
(52) U.S. Cl. .................. 464/131; 277/307; 277/928
(58) Field of Classification Search .................. 464/17, 464/131, 133; 277/307, 552, 562, 566–569, 277/928
See application file for complete search history.

(56) References Cited

U.S. PATENT DOCUMENTS

| 3,377,820 | A |   | 4/1968 | Smith, Jr. |
| 3,592,022 | A | * | 7/1971 | Stokely ........................ 464/131 |
| 3,906,746 | A | * | 9/1975 | Haines ......................... 464/131 |
| 4,154,490 | A |   | 5/1979 | Kohler et al. |
| 4,337,956 | A | * | 7/1982 | Hopper ......................... 277/552 |
| 4,515,574 | A | * | 5/1985 | Mazziotti ..................... 464/131 |
| 4,611,932 | A | * | 9/1986 | Olschewski et al. ..... 464/131 X |
| 6,601,855 | B1 |  | 8/2003 | Clark |

FOREIGN PATENT DOCUMENTS

| DE | 21 44 172 Y | 3/1973 |
| DE | 27 18 503 X | 11/1978 |
| DE | 30 17 452 Y | 11/1981 |
| DE | 31 09 787 X | 1/1982 |
| DE | 41 28 179 DA | 2/1993 |
| DE | 195 42 100 Y | 6/1997 |
| DE | 103 02 069 A | 7/2004 |
| GB | 2 072 764 Y | 10/1981 |
| WO | 2005/017376 PA | 2/2005 |

* cited by examiner

*Primary Examiner*—Greg Binda
(74) *Attorney, Agent, or Firm*—Lucas & Mercanti, LLP

(57) ABSTRACT

A universal joint bush for a universal joint of a universal joint shaft. In order to seal an annular gap, which is produced between the journal and the universal joint bush, a sealing ring is provided which encloses radially outwardly directed sealing lips. During assembly of the universal joint bush on the journal, the sealing lips, which are connected directly or indirectly to a radially inwardly directed rim of the universal joint bush, make a venting means possible, through which the air which is enclosed in the inner space of the universal joint bush can escape.

8 Claims, 2 Drawing Sheets

SEALING RING FOR A UNIVERSAL JOINT BUSH

FIELD OF THE INVENTION

The present invention relates to a universal joint bush which is designed for a joint of a joint shaft which comprises two shafts which have forks at their ends and are connected via a universal joint. The individual journals of the universal joint are mounted pivotably via a roller bearing in universal joint bushes of cup-like design. Here, an annular gap which is produced between the journal of the universal joint and the universal joint bush is sealed via a sealing ring.

BACKGROUND OF THE INVENTION

Universal joint shafts are used in various technical areas, such as in passenger motor vehicles, trucks, landborne vehicles and construction and earthmoving machines, and serve to transmit torques at a defined deflection angle. In these machines and vehicles, the universal joint bushes of the universal joints are subjected to external influences such as dust, water, sand and mud. If the universal joint bushes of the universal joint which are configured as precision bearings are not sealed sufficiently, premature failure of the bearing and therefore of the universal joint shaft can occur. In order to exchange the universal joint bushes and/or the universal joint, relatively extensive assembly outlay is required, in association with a disadvantageous downtime of the machine.

A universal joint bush of the design type which is described in the above text is known, for example, from DE 41 28 179 A1. In order to seal the annular gap between the journal of the universal joint and the universal joint bush, the known solution has a sealing arrangement which comprises two sealing rings. Here, a first sealing element which is configured as a radial shaft sealing ring is pressed into the universal joint bush at the open end. Furthermore, the sealing arrangement comprises a sealing ring which is fixed in terms of rotation on the journal of the universal joint, covers the end side of the universal joint bush and simultaneously engages with a rim into a stepped, end-side region of the universal joint bush and engages into an annular groove by means of a sealing lip. This known sealing arrangement, the sealing rings of which have reinforcements in a coinciding manner, causes high manufacturing costs and requires great assembly expenditure and an increased axial installation space at least in the axial direction.

SUMMARY OF THE INVENTION

The present invention is based on the object of realizing a sealing means for a universal joint bush which can be manufactured inexpensively, can be assembled simply and is effective, in order to achieve a long service life.

According to the invention, a single-piece sealing ring is provided for sealing the annular gap of the universal joint bush. In the preassembly step, the sealing ring is assigned to the universal joint bush in such a way that the sealing ring is automatically pushed onto the journal of the universal joint during assembly, until an end position is reached. In the installation position, the sealing ring is therefore fixed on a circumferential face of the journal of the universal joint.

The construction according to the invention of the single-piece sealing ring comprises a plurality of sealing lips which are connected integrally to one another, are directed radially outward and of which at least one sealing lip is assigned to the universal joint bush. Here, one sealing lip is connected in a form-fitting manner to the universal joint bush. In the preassembly step, this sealing ring construction makes a captive assignment possible of the sealing ring on the universal joint bush, as a result of which the assembly of the universal joint bush can be simplified.

In previous assembly sequences, the sealing ring has been preassembled on the journal of the universal joint, before the universal joint bush has been advanced axially on the journal. In comparison with this, the sealing function of the sealing ring is improved by the invention which assigns the sealing ring to the universal joint bush during the preassembly step. The assignment according to the invention of the sealing ring, in conjunction with its design, effectively prevents a faulty installation position of the sealing lips with respect to the universal joint bush. As a result of the single-piece construction of the sealing ring according to the invention which assumes the function both of the inner seal, that is to say the seal which is placed within the universal joint bush, and also the function of the preliminary seal, the amount of components and the assembly expenditure are reduced. Moreover, a cost advantage is produced for the single-piece sealing ring according to the invention in comparison with the known two-piece design.

Further advantageous refinements are the subject matter discussed below.

In one advantageous refinement, the sealing ring construction encloses three sealing lips which are connected integrally to one another and are directed radially outward in a coinciding manner. Here, two sealing lips are preferably assigned to the universal joint bush and one sealing lip is assigned to the journal of the universal joint.

Another advantageous refinement of the invention provides for the universal joint bush to be manufactured without cutting by a deep-drawing process. On the end side in the region of the opening, the universal joint bush of cup-like design is provided with a radially inwardly directed, circumferential rim, on which two sealing lips of the sealing ring are supported directly or indirectly. The support of the sealing lips on the rim of the universal joint bush results in the preassembly step in the captive assignment of the sealing ring on the universal joint bush. At the same time, this makes it possible to achieve an end position, which is important for the function of sealing, of the sealing ring on the circumferential face of the journal which is connected to the universal joint.

The sealing ring according to the invention is preferably supported in the installation position via a sealing lip on an inner wall of the universal joint bush. Furthermore, this sealing lip forms partially axially protruding projections which bear against the end-side rim of the universal joint bush on the inside in the installation position.

The central sealing lip of the sealing ring is supported on the outside on the rim of the universal joint bush. The sealing lips which are assigned directly or indirectly to the rim of the universal joint bush and their dimensional design ensure an optimum supporting force of the sealing lip on the associated contact face of the rim. This produces an improved sealing function, as a result of which the disadvantageous contamination of the inner space of the universal joint bush is avoided effectively.

In a coinciding manner, the sealing lip which is positioned within the universal joint bush and the sealing lip which is supported on the outside on the rim of the universal joint bush are inclined in the direction of the rim of the universal joint bush in the installation state. This inclined installation position of the sealing lips, in conjunction with the partially axially protruding projections of the inner sealing lip, make a venting means possible of the inner space of the universal joint bush during assembly. When the structural unit which comprises the universal joint bush, the rolling bodies and the sealing ring is pushed onto the journal of the universal joint, the air which is enclosed in the universal joint bush is not compressed. As soon as the journal of the universal joint has passed the sealing ring during assembly, the enclosed air within the universal joint bush can already escape after a slight pressure increase. To this end, the air brings about a yielding movement, which is directed in the clockwise direction, of the sealing lip which is supported in an inclined manner on the inside on the universal joint bush, in the zones which are produced between the partially axially protruding projections. The air from the interior of the universal joint bush subsequently passes a gap size which is delimited radially by the seal base and the end contour of the end-side rim of the universal joint bush, before the air subsequently pivots the central sealing lip of the sealing ring which is supported on the outside in an inclined manner on the rim, likewise in the clockwise direction. Effective venting of the inner space of the universal joint bush during assembly is therefore produced.

In the installed state, the third lip of the sealing ring according to the invention is supported on a stepped section of the journal of the universal joint. In the installation position, V-shaped spreading of both sealing lips or a V-shaped annular groove is produced between the central sealing lip and the sealing lip which is assigned to the journal.

Furthermore, the sealing ring according to the invention forms an axial stop for the rolling bodies of the radial bearing within the universal joint bush. To this end, the sealing ring base or the sealing ring bottom can be extended accordingly, in order to achieve a locally delimited axial stop for the rolling bodies.

The inner sealing lip of the sealing ring according to the invention is preferably supported on a section of the universal joint bush, which section is of reduced wall thickness, that is to say forms a radial step. This measure requires firstly an inner sealing lip of the sealing ring which is preferably extended and improves the elasticity, and secondly simplified forming without cutting of the wall of the universal joint bush, in order to form a radially inwardly directed rim.

A further cost advantage can be achieved by the use of a sealing ring which is manufactured exclusively from plastic or a sealing ring material. Furthermore, the invention includes providing the sealing ring with a reinforcement at least in regions. It is preferably suitable to introduce a disk-like reinforcement into the sealing ring on the end side, which disk-like reinforcement at the same time forms an axial stop for the rolling bodies of the radial bearing.

The above-described sealing ring, according to the invention, advantageously makes possible the assembly method which is described in the following text for a joint of a universal joint shaft.

The joint which is provided for this method has the following construction:
  two shafts which have forks at their ends are provided with two holes which are arranged opposite one another for receiving in each case one universal joint bush;
  a journal of the universal joint is inserted in every universal joint bush of cup-like design, which journal can be pivoted via rolling bodies of cylindrical design;
  a sealing ring which comprises three radially outwardly directed sealing lips is provided for sealing an annular gap which is produced between the journal and the universal joint bush;
  a sealing lip which is supported on an inner wall of the universal joint bush is provided partially with axially protruding projections which are supported on a rim of the universal joint bush and which ensure a venting means of an inner space of the universal joint bush.

The method according to the invention for assembly of the joint of a universal joint shaft takes place in the following steps:
  inserting the universal joint into holes of the fork;
  introducing the rolling bodies and the sealing ring into the universal joint bush, in order to form the structural unit;
  pressing a structural unit into every hole of the fork; synchronously to this:
    each universal joint bush is pushed onto the journal of the universal joint;
    the sealing ring is displaced until it reaches a final position on a circumferential face of the journal.;
    the air which is enclosed in the inner space of the universal joint bush escapes via the sealing lips which together form the venting means.

BRIEF DESCRIPTION OF THE DRAWINGS

Preferred exemplary embodiments according to the invention are shown diagrammatically in the drawings and will be explained in greater detail using said drawings, in which.

DETAILED DESCRIPTION OF THE DRAWINGS

Figure 1:
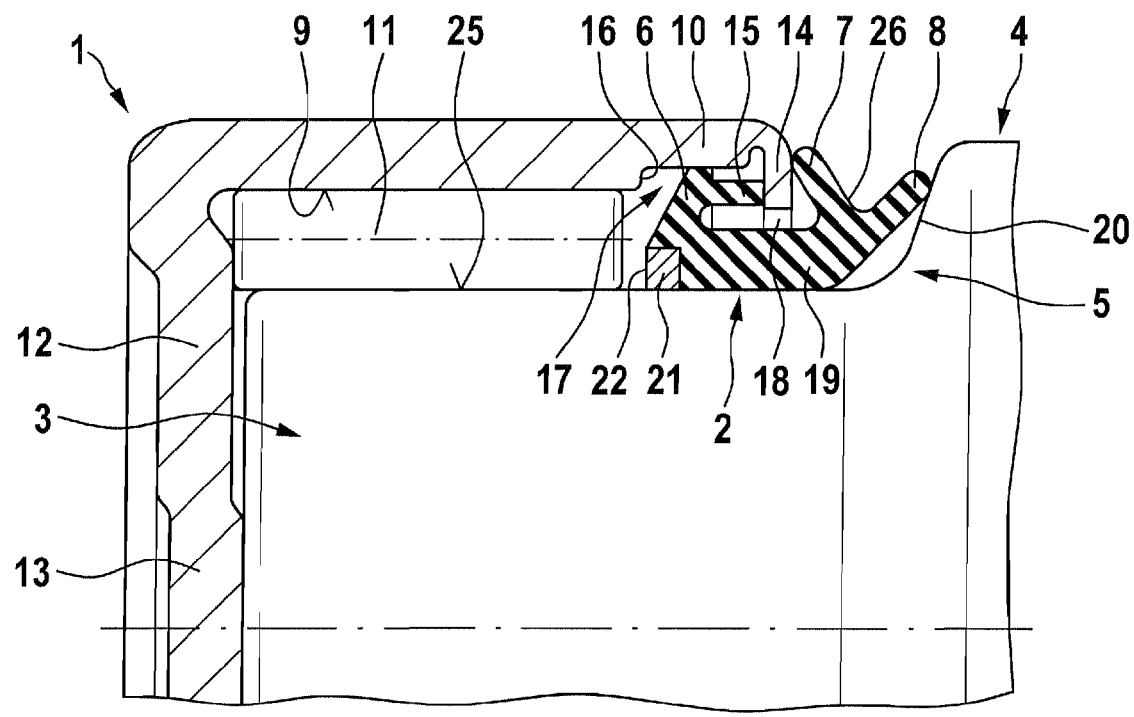
FIG. 1 shows, in a half section, details of a universal joint in conjunction with a universal joint bush and its sealing ring according to the invention.

As is to be gathered from FIG. 1, the universal joint bush 1 is sealed via a sealing ring 2 with respect to a journal 3 of the universal joint 4. The sealing ring 2 has the object of effectively sealing an annular gap 5 which is formed between the universal joint bush 1 and the journal 3. The sealing ring 2 of single-piece design is provided with three sealing lips 6, 7, 8 which are directed radially outward as far as possible and of which the sealing lips 6, 7 are assigned to the universal joint bush 1 and the sealing lip 8 is assigned to the journal 3. Here, the sealing ring 2 which is of single-piece design and is manufactured from a plastic or from a sealing material at the same time fulfils the function of an inner seal and a preliminary seal, that is to say the sealing ring 2 assumes the function of previously two separate seals, with which universal joint bushes have been sealed.

The universal joint bush 1, which is preferably manufactured without cutting by a deep drawing process, serves to receive cylindrically designed rolling bodies 11, which are guided on an inner wall 9 of the universal joint bush 1 and a circumferential face 25 of the journal 3. The rolling bodies form a radial bearing, via which the journal 3 of the universal joint 4 can be pivoted with respect to the forks of the joint shaft, which comprises two shafts. The forks are not shown in FIG. 1 and are fixed rotationally in holes. On the end side, a base 12 of the universal joint bush 1 has a projection 13 which points in the direction of the journal 3 and forms an end stop or an axial bearing for the journal 3. At the end which faces away from the base 12, the universal joint bush 1 has a radially inwardly directed, circumferential rim 14. Here, the rim 14 adjoins a section 10 of reduced wall thickness of the outer wall of the universal joint bush 1, which section 10 forms a radial step 16.

The sealing lip 6 which can also be denoted as an inner seal is supported in a force-fitting manner on the section 10 of reduced wall thickness of the inner wall 9. Here, the sealing lip 6 has axially protruding projections 15 which are arranged partially distributed over the circumference and via which the sealing lip 6 is supported axially on the rim 14 in a punctiform manner. The central sealing lip 7 is assigned on the outside to the end side of the rim 14. In the operating state, the sealing lips 6, 7 are in each case inclined in the direction of the rim 14 and, together with the axially protruding projections 15 of the sealing lip 6, form a venting means 17, through which air which is enclosed in the universal joint bush 1 can escape during assembly of the journal 3 in the universal joint bush 1.

The construction according to the invention of the sealing ring 2 makes an assembly sequence possible, according to which the preassembled structural unit, comprising the universal joint bush 1, the rolling bodies 11 and the sealing ring 2, is pushed jointly axially onto the journal 3 of the universal joint 4. As soon as the journal 3 has passed the installation position of the sealing ring 2 during assembly, the air which is enclosed within the universal joint bush 1 is compressed, which air can advantageously escape virtually without resistance via a venting means 17. As soon as the air pressure of the enclosed air within the universal joint bush 1 has exceeded a value which exceeds the supporting force of the sealing lip 6, the latter yields in the zones 24 between the projections 15 by pivoting in the clockwise direction. The enclosed air subsequently passes via a gap size 18 which is delimited radially by the rim 14 and a seal base 19 into a contact zone between the sealing lip 7 and the rim 14. As a result of the corresponding design of the sealing ring 2, the supporting force of the sealing lip 7 does not differ from that of the sealing lip 6, with the result that the sealing lip 7 is also raised up and escape of the enclosed air is made possible.

The further sealing lip 8 of the sealing ring 2 is supported on a stepped section 20 of the journal 3. As a result of the spreading of the sealing lips 7, 8 in each case in opposite directions, a circumferential annular groove 26 of V-shaped design is formed. As an alternative to a sealing ring 2 which is manufactured exclusively from plastic or a sealing ring material, the sealing ring 2 can include reinforcements. According to FIG. 1, the sealing ring 2 is provided with a reinforcement 21 of disk-like design, in order to form a wear-resistant axial stop 22 for the rolling bodies 11.

Figure 2:
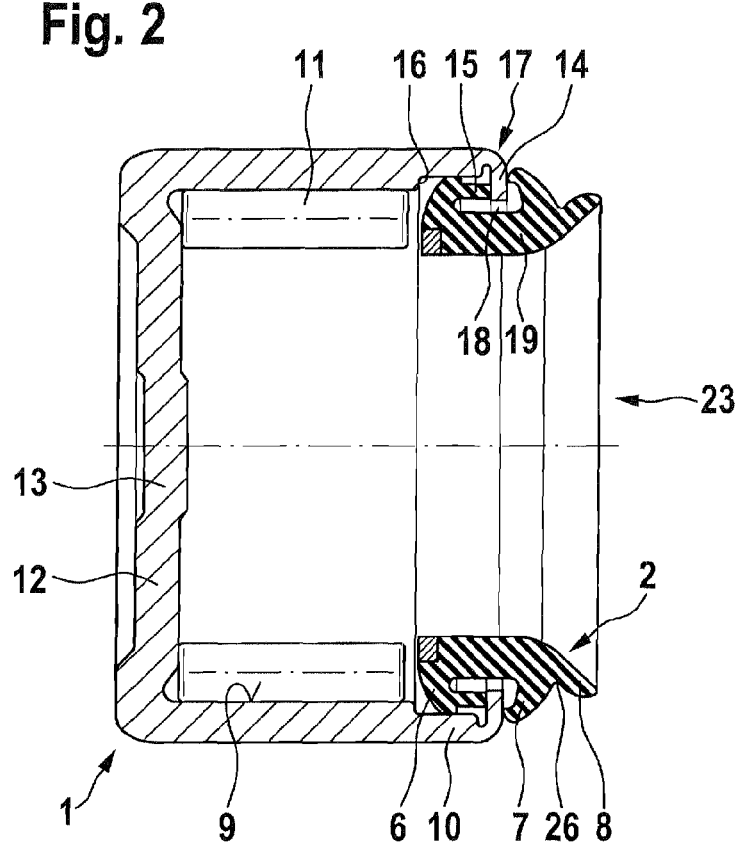
FIG. 2 shows a structural unit which can be preassembled and comprises the universal joint bush, the radial bearing and the sealing ring.

FIG. 2 shows the structural unit 23 which can be preassembled, comprising the universal joint bush 1, the rolling bodies 11 and the sealing ring 2. As a result of the design of the sealing ring 2, in which the sealing lip 6 reaches behind the rim 14 of the universal joint bush in a form-fitting manner, a captive arrangement of the sealing ring 2 on the universal joint bush 1 is produced. The structural unit 23 is therefore suitable for automated assembly with the universal joint 4.

Figure 3:
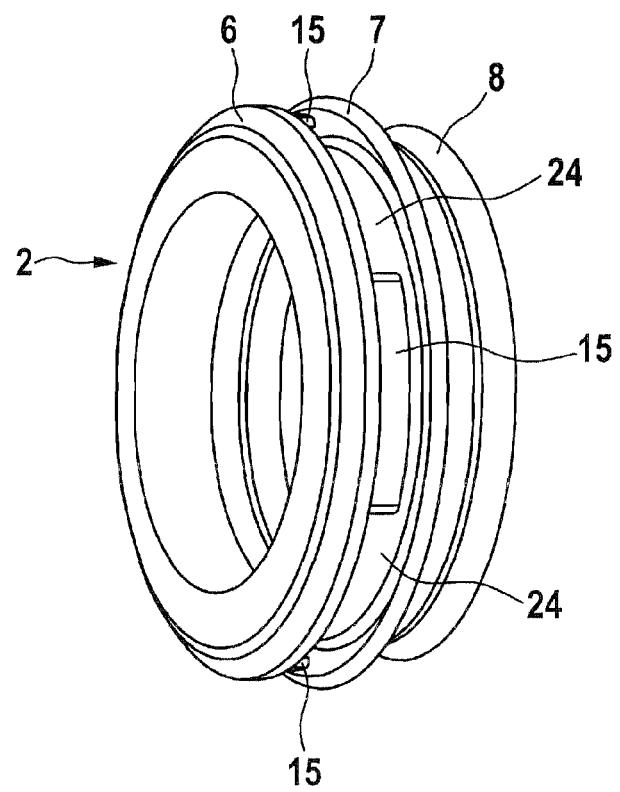
FIG. 3 shows the sealing ring according to the invention in perspective as an individual part.

FIG. 3 shows the sealing ring 2 as an individual part in perspective. This illustration clarifies, in particular, the configuration of the axially protruding projections 15 of the sealing lip 6 which are supported on the rim 14 of the universal joint bush 1 in the installation state. The design of the sealing lips 6, 7, in conjunction with the axial projection 15, form a venting means 17. To this end, the sealing lip 6 can be raised up in each case from the inner wall 9 of the universal joint bush 1 between the axial projections 15, in the regions of the zones 24, in order that the air which is enclosed in the universal joint bush 1 during assembly can escape in an unimpeded manner.

LIST OF DESIGNATIONS

1 Universal joint bush
2 Sealing ring
3 Journal
4 Universal joint
5 Annular gap
6 Sealing lip
7 Sealing lip
8 Sealing lip
9 Inner wall
10 Section (of reduced wall thickness)
11 Rolling body
12 Base
13 Projection
14 Rim
15 Projection
16 Step (radial)
17 Venting means
18 Gap size
19 Seal base
20 Section
21 Reinforcement
22 Axial stop
23 Structural unit
24 Zone
25 Circumferential face
26 Annular groove

The invention claimed is:

1. An assembly, comprising:
a universal joint bush;
a journal being pivoted by the universal joint bush, the joint bush having a side wall with a section of reduced wall thickness forming a radial step and a radially inwardly directed circumferential rim; and
a single piece sealing ring, which seals an annular gap between the journal and the universal joint bush, the sealing ring having a first sealing lip, a second sealing lip, and a third sealing lip connected integrally to each other,
in an installed state, the first sealing lip being supported on an inner surface of the section of reduced wall thickness and having axially protruding projections which are partially distributed around the circumference of the sealing ring and are supported axially on an inner wall of the rim, the second sealing lip being supported in an inclined manner on an outer wall of the rim, and the third sealing lip being supported in an inclined manner on a stepped section of the journal.

2. The assembly of claim 1, wherein the bush is manufactured without cutting by a deep drawing process.

3. The assembly of claim 1, wherein the first sealing lip, in conjunction with the second sealing lip ensures venting of an inner space of the universal joint bush, at least during assembly.

4. The assembly of claim 1, wherein the second sealing lip and the third sealing lip form a circumferential annular groove of V-shaped design in the installation state.

5. The assembly of claim 1, wherein an end side of the sealing ring forms an axial stop for the rolling bodies.

6. The assembly of claim 1, wherein the sealing ring is manufactured exclusively from plastic or a sealing ring material.

7. The assembly of claim 1, wherein the sealing ring encloses a reinforcement, at least in regions.

8. A method for assembling a universal joint comprising the following steps:

inserting the universal joint into holes of a fork;

introducing rolling bodies and a sealing ring into a universal joint bush to form a structural unit; and pressing the structural unit into every hole of the fork at the same time as:

each universal joint bush is pushed onto a journal of the universal joint;

the sealing ring is displaced until the sealing ring reaches a final position on a circumferential face of the journal; and air, which is enclosed in an inner space of the universal joint bush, escapes via sealing lips which together form a vent.

\* \* \* \* \*